(12) United States Patent
Trujillo

(10) Patent No.: US 11,554,649 B2
(45) Date of Patent: Jan. 17, 2023

(54) SPORT UTILITY VEHICLE ENCLOSURE

(71) Applicant: Adam L Trujillo, Southington, CT (US)

(72) Inventor: Adam L Trujillo, Southington, CT (US)

( * ) Notice: Subject to any disclaimer, the term of this patent is extended or adjusted under 35 U.S.C. 154(b) by 272 days.

(21) Appl. No.: 16/777,117

(22) Filed: Jan. 30, 2020

(65) Prior Publication Data

US 2021/0237547 A1 Aug. 5, 2021

(51) Int. Cl.
  *B60J 7/10* (2006.01)
  *B60J 5/06* (2006.01)

(52) U.S. Cl.
  CPC ............. *B60J 7/102* (2013.01); *B60J 5/067* (2013.01); *B60J 7/104* (2013.01)

(58) Field of Classification Search
  CPC . B60J 7/102; B60J 7/085; B60J 7/1226; B60J 7/1291; B60J 7/143; B60J 7/0023; B60J 5/0487
  USPC ............... 296/130, 141, 216.01, 83
  See application file for complete search history.

(56) References Cited

U.S. PATENT DOCUMENTS

| | | | | |
|---|---|---|---|---|
| 1,748,114 A * | 2/1930 | Dayes | ............ | B60J 7/085 296/102 |
| 3,175,859 A * | 3/1965 | Abodeely | ............ | B60J 7/1226 296/136.09 |
| 4,733,902 A * | 3/1988 | Rabb | ............ | B60J 7/104 296/214 |
| 5,259,656 A * | 11/1993 | Carroll | ............ | B60J 11/00 150/159 |
| 6,206,454 B1 * | 3/2001 | Cory | ............ | B60J 7/10 160/273.1 |
| 6,439,637 B1 * | 8/2002 | Tyrer | ............ | B60J 1/04 296/145 |
| 6,817,647 B1 * | 11/2004 | Green | ............ | B60J 7/10 296/102 |
| 6,916,059 B2 * | 7/2005 | Feinberg | ............ | B60J 5/00 296/145 |
| 7,025,404 B1 * | 4/2006 | Gilbert | ............ | B60J 7/10 135/913 |
| 7,086,685 B1 * | 8/2006 | Zeugner | ............ | B60J 7/102 296/100.01 |
| 8,550,538 B1 * | 10/2013 | Brandenburg | ............ | B60P 3/341 296/159 |

(Continued)

OTHER PUBLICATIONS

Bestop, "Bestop—Tigertop BDKW_51408-INS_001", Installation Instruction for Part No. 51408, 2018 (Year: 2018).*

(Continued)

*Primary Examiner* — Jason S Morrow
*Assistant Examiner* — Wenwei Zhuo
(74) *Attorney, Agent, or Firm* — Robert S. Smith

(57) ABSTRACT

The apparatus cooperates with a vehicle having a chassis, and engine compartment and a passenger compartment and a framework extending above the passenger compartment and a windshield assembly which is disposed in front of the passenger compartment which includes a single flexible sheet material formed into a generally rectangular top section. The top section has first and second opposed edges as well as the front edge and a back edge. The front edge includes a lip dimensioned and configured for engagement with a header bar that is part of the sport utility vehicle and disposed proximate to the top of the windshield assembly.

1 Claim, 3 Drawing Sheets

(56) References Cited

U.S. PATENT DOCUMENTS

| | | | | |
|---|---|---|---|---|
| 2007/0018485 A1* | 1/2007 | Jacobson | ............... | B60J 7/10 |
| | | | | 296/210 |
| 2008/0231071 A1* | 9/2008 | Causey | ............... | B60J 7/102 |
| | | | | 296/107.15 |
| 2010/0060027 A1* | 3/2010 | Marsh | ............... | B60J 5/0487 |
| | | | | 296/79 |
| 2020/0254859 A1* | 8/2020 | Gauci | ............... | B60J 7/1234 |

OTHER PUBLICATIONS

Bestop, "Bestop Amazon 51117 Installation Instructions", Amazon, 2005 (Year: 2005).*

Amazon, "Bestop 5111701 Black Replace-A-Top for OEM Hardware—Jeep 1976-1983 CJ5", 2005 (Year: 2005).*

Bestop, "Tigertop™ Soft Top Jeep 1976-1986 CJ7", 2018 (Year: 2018).*

Amazon, "Bestop 5140801 Tigertop for 1976-1986 CJ5_CJ7", 2005 (Year: 2005).*

Richardson, Barry, "What is 600D Polyester and How Strong Is It Really?" Camps and Trails, Wayback Machine, Dec. 4, 2018 (Year: 2018).*

\* cited by examiner

SPORT UTILITY VEHICLE ENCLOSURE

TECHNICAL FIELD

The present invention is generally directed to enclosures for sport utility vehicles. Typically, the present invention has particular application to sport utility vehicles that are configured for warm weather without doors with only a framework disposed above a passenger compartment whereby the passengers experience an open-air ride that is significantly more robust than, for example, than the ride provided by a typical convertible.

BACKGROUND OF THE INVENTION

Currently, removably attachable tops for vehicles such as sport utility vehicles fall into two categories based upon the materials out of which they are constructed. The first type of top is commonly known as a "soft top". Soft tops are usually made from vinyl, canvas, or other pliable, cloth-like materials. Soft tops are also removably attachable to the motor vehicle and are usually shaped in part by an internal frame that is also removably attachable to the motor vehicle and to the material out of which the top is manufactured. Soft tops are most often are more manageable by one person and, if necessary, the top, when removed, can be stored in the vehicle whereby the top is available, for example, in the event of unexpected rain or other storms as well as unexpected cold weather.

A major drawback of hardtops is that they are often awkward, cumbersome, and heavy. It is virtually impossible for one person to remove the hard top unassisted, and removal usually requires the use of currently available mechanical devices, such as winches or hoists. Once removed, the hardtop requires a large amount of space for storage, as it is fragile when removed and standing apart from the vehicle and must, therefore, be stored carefully.

From the above, it is therefore seen that there exists a need in the art to overcome the deficiencies and limitations described herein and above.

SUMMARY OF THE INVENTION

The shortcomings of the prior art are overcome and additional advantages are provided through an enclosure for a sport utility vehicle having a chassis, and an engine compartment and a passenger compartment and a framework extending above the passenger compartment and a windshield assembly which is disposed in front of the passenger compartment. The enclosure is formed from a flexible sheet material and consists of a generally rectangular top section. The top section has first and second opposed edges as well as a front edge and a back edge. The front edge includes a lip dimensioned and configured for engagement with a header bar that is part of the sport utility vehicle and disposed proximate to the top of the windshield assembly. The apparatus further includes first and second side portions, each side portion has a top and a bottom, the top of each side portion is fixed to one of the first and second opposed edges; and a back portion having a top thereof affixed to the back edge.

In some embodiments the zipper has a generally U-shaped extent and the enclosure may include first and second straps disposed in spaced relation extending from the bottom of each side portion to the chassis of the sport utility vehicle whereby the enclosure is taunt with respect to the framework and chassis of the sport utility vehicle. Additionally, a first Y-shaped strap may extend from first and second spaced points on the enclosure to the chassis of the sport utility vehicle. More specifically, the enclosure may include a second Y-shaped strap extending from first and second spaced points on the enclosure to the chassis of the sport utility vehicle. The first Y-shaped strap and said second Y-shaped strap may be disposed at the corners of the passenger compartment that are remote from the engine compartment.

Accordingly, it is an object of the present invention to provide apparatus that provides potential protection for passengers that can easily be stored on the vehicle without significantly impacting either the exhilarating ride or space within the vehicle.

Additional features and advantages are realized through the techniques of the present invention. Other embodiments and aspects of the invention are described in detail herein and are considered a part of the claimed invention.

The recitation herein of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

The subject matter which is regarded as the invention is particularly pointed out and distinctly claimed in the concluding portion of the specification. Although specific features of various exemplary embodiments of the invention may be shown in some drawings and not in others, this is for convenience only. In accordance with the principles of the invention, any feature of a drawing may be referenced and/or claimed in combination with any feature of any other drawing.

The invention, however, both as to organization and method of practice, together with the further objects and advantages thereof, may best be understood by reference to the following description taken in connection with the accompanying drawings in which.

DETAILED DESCRIPTION

While the present invention has a particular application to Jeep Wrangler vehicles, those skilled in the art will recognize the apparatus of the present invention has an application to other vehicles. Thus, the vehicle may be any vehicle having an open compartment such as an Isuzu Amigo®, a Suzuki Sidekick®, a Fiat Chrysler Jeep®, or a General Motors Hummer® Open Top vehicle.

Those skilled in the art will recognize that the shape and proportions of these and other sport vehicle are not uniform in any given year as well as in different years and different models. Thus, for example, that even the location and size of the side mirrors will vary. Typically, the enclosure in accordance with the present invention is dimensioned and configured to avoid any interference with the mirror. Commonly, the side mirrors are mounted on the body of the vehicle. Accordingly, if the doors of the vehicle are removed, the side mirrors will continue to be functional.

Figure 2:
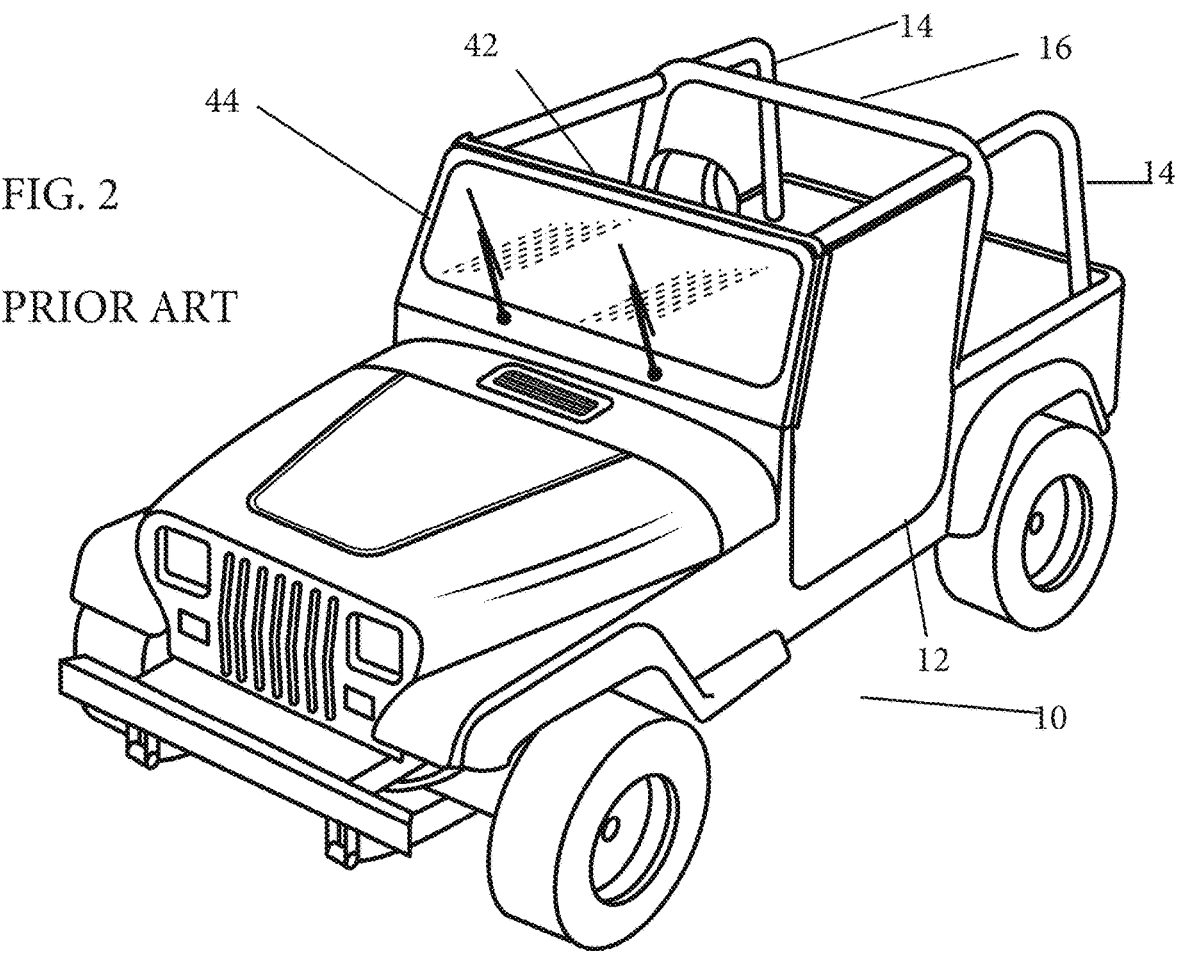
FIG. 2 is a perspective view of the same vehicle.
Figure 1:
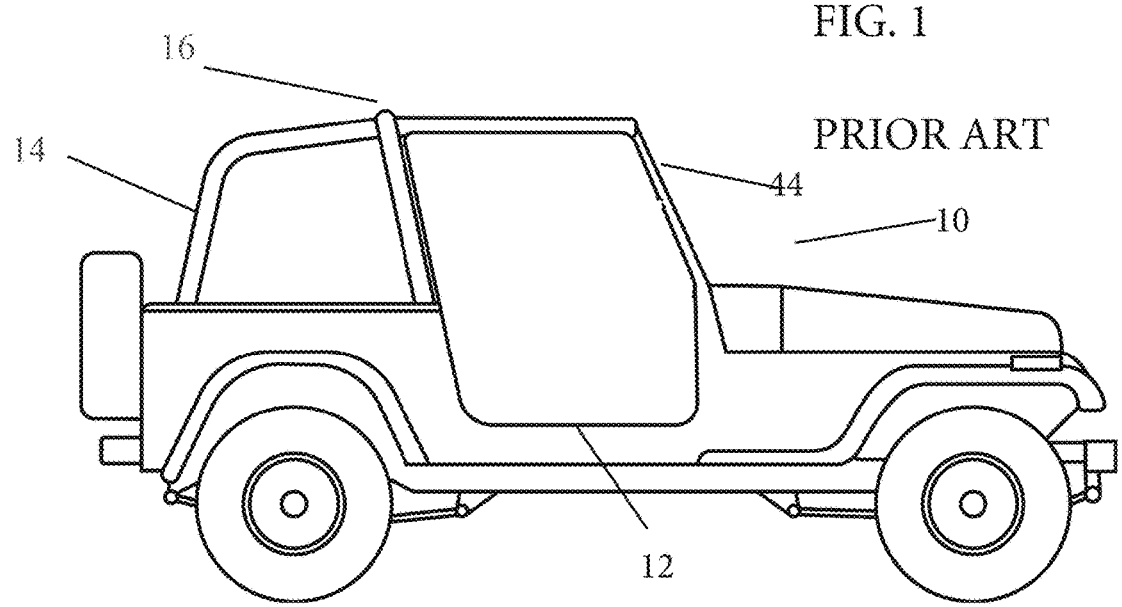
FIG. 1 is a partially schematic side elevation view of a typical sport utility vehicle without any enclosure of the passenger compartment. Although the illustration shows a side door, it will be understood that the invention has particular application to vehicles from which rigid hard doors have been removed.
Figure 3:
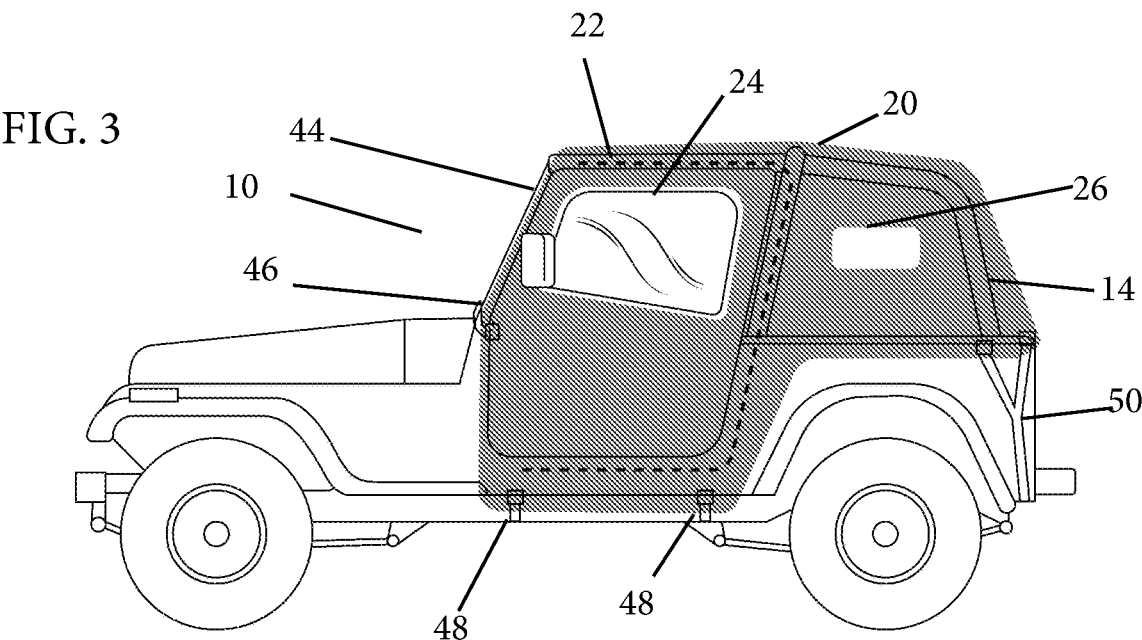
FIG. 3 is a partially schematic view of the same vehicle with an embodiment of the present invention superimposed on the FIG. 1 image. The dashed line represents a zipper that allows a person to get in or out of the vehicle. It will be understood that the door shown in FIG. 1 will ordinarily be removed when the cover in accordance with the present invention is installed.

The FIG. 1 and FIG. 2 are marked as prior art because they merely indicate the general contours of a typical sport utility vehicle 10 that is often driven in warm weather with no hard enclosure as well as without conventional doors. The passenger compartment, after removal of any hard enclosure (not shown) as best seen in FIG. 2 is surrounded by side rails 14 and a transverse rail 16. The outline 12 schemtically indicates the location of the doorway which is completely open when the doors and hardtop are removed. FIG. 3 illustrates, partly schematically, the enclosure 20 in accordance with one form of the present invention. More particularly, the enclosure 20 encloses the top, sides and back of the passenger compartment of the sport utility vehicle 10. A zipper 22 is provided on each side of the enclosure 20 to allow ingress and egress to and from the enclosure 20. Transparent plastic windows 24, 26 are disposed on opposed sides of the enclosure 20.

Figure 4:
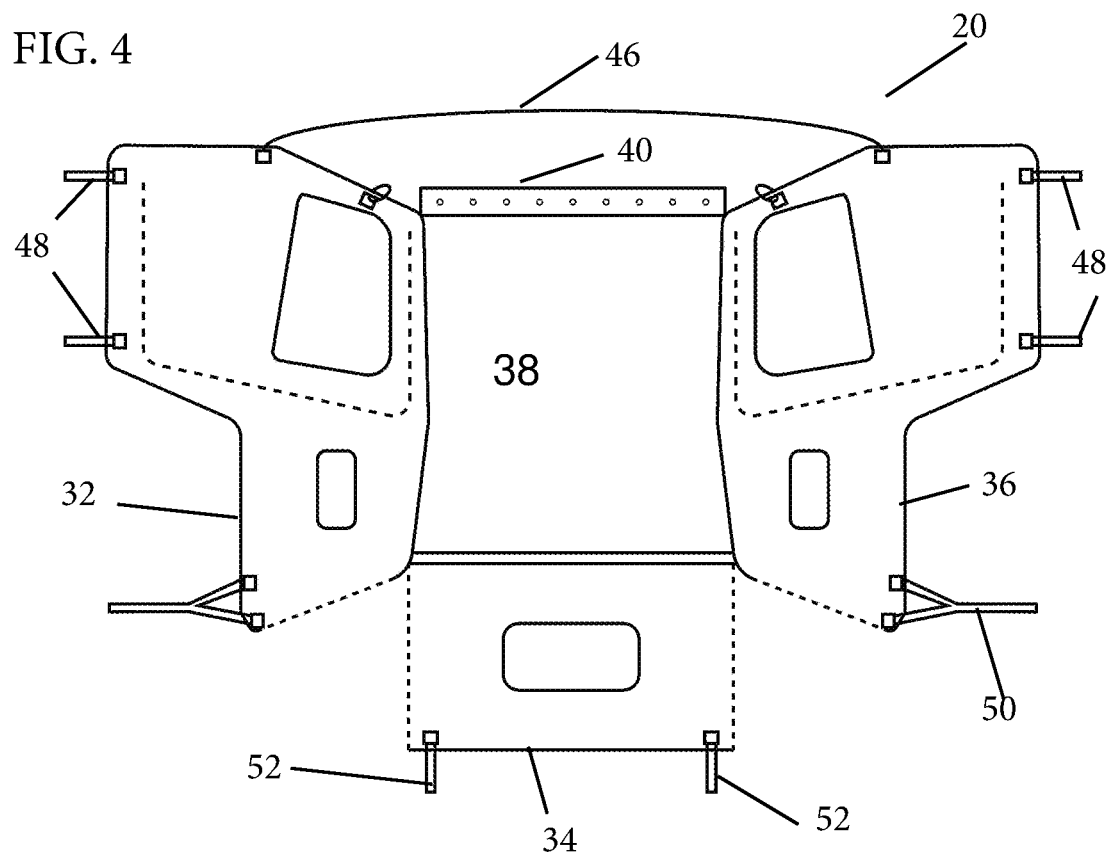
FIG. 4 shows the overall shape of the illustrated embodiment of the cover deployed on a planar surface.
Figure 5:
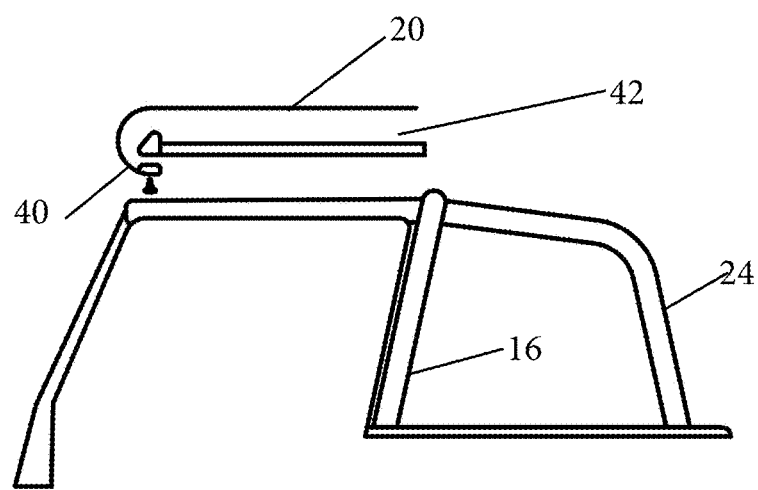
FIG. 5 is an exploded view showing the stored position of the cover where the edge of the cover is attached between the top of the windshield and a header bar that is part of the vehicle.

As described above, FIG. 4 illustrates the shape of the enclosure 20 when it is spread out on a planar surface such as a floor. The enclosure 20 includes four major sections. They are left side 32, back 34, right side 36 and top 38. In one form of the present invention the enclosure 20 is fabricated from Ottertex® canvas marketed by Vogue Group Inc DBA Fabric Wholesale Direct a Corporation formed under the laws of New York and having a business address: 550 Smith Street Farmingdale, N.Y. 11735. More specifically, the fabric is described at their website www.ottertex.com with assertions that the Ottertex® canvas waterproof oxford fabric is perfect for all types of indoor and outdoor use. This fabric is 600×600 denier, 100% polyester and 61/62" wide. The canvas waterproof features a plastic PVC backing with a waterproof coating, making it extremely durable and resilient. The fabric also has mold and UV resistance qualities. The thickness of the canvas measures approximately 0.55 mm and roll sizes are approximately 50 yards each. The canvas material is also extremely flexible, which makes it very easy to conform to all types of projects. It has also been manufactured particularly to resist creasing despite its pliability. This canvas fabric can be used for chair pads, backpacks, cushions, toss pillows, tote bags, heavy duty travel accessories, patio furniture, boat covers and more. The canvas fabric is extremely versatile in its applications and can be used for mass production or simple upholstery projects.

Figure 6:
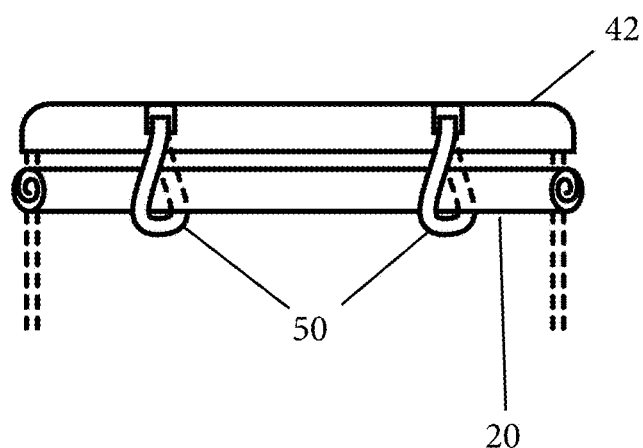
FIG. 6 is a view of the cover rolled up at the top of the windshield when stored on the vehicle, ready to be deployed when required.

Advantageously, the enclosure 20 includes a lip 40 that is engaged by a header bar 42 that is part of the sport utility vehicle 10. More specifically, the header bar 42 secures the lip 40 of the enclosure 20 to the top of the windshield assembly 44. Accordingly, the left side 32 can be folded over on top of the top 38 as well as the right side 36 can be folded over on top of the top 38 and thereafter the back 34 can be rolled toward the front of the vehicle 10 whereby the entire rolled up enclosure 20 may be secured to the header bar 42 at the top of the windshield assembly 44 by straps as shown in FIG. 6.

When the enclosure 20 is not deployed, the enclosure 20 is rolled up and secured by straps 50, 50.

When the enclosure 20 is deployed the enclosure is secured to the sport utility vehicle 10 by a strap 46 that extends across the firewall (not shown) intermediate the engine compartment and the passenger compartment of the sport utility vehicle 10. More specifically the strap 46 extends just below the windshield assembly 44. Furthermore, the enclosure 20 is further secured to the body of the sport utility vehicle 10 by straps 48, 48 disposed proximate to the forward and aft extent of the zipper 22. Will be understood that the straps 48, 48 stabilize the relationship between the enclosure 20 and the body of the sport utility vehicle 10 when the zipper 22 is being open or closed. A still further connection is made between the enclosure 20 and the body of the sport utility vehicle 10 by a Y-shaped strap 50 that connects the rear most part of the enclosure 20 to the body of the sport utility vehicle 10. More specifically, the strap 50 has an axial extremity that engages the body of the sport utility vehicle 10 as well as a second axial extremity having a forked end upper engaging spaced apart points on the enclosure 20. Accordingly, the enclosure 20 is securely attached to the body of the sport utility vehicle 10.

Additional spaced apart straps 52, 52 secure the enclosure 20 to the back 34 of the body of the sport utility vehicle 10.

All publications and patent applications mentioned in this specification are indicative of the level of skill of those skilled in the art to which this invention pertains. All publications and patent applications are herein incorporated by reference to the same extent as if each individual publication or patent application was specifically and individually indicated to be incorporated by reference.

It will be understood that, in general, terms used herein, and especially in the appended claims, are generally intended as "open" terms (e.g., the term "including" should be interpreted as "including but not limited to," the term "having" should be interpreted as "having at least," the term "includes" should be interpreted as "includes but is not limited to," etc.). It will be further understood that if a specific number of an introduced claim recitation is intended such an intent will be explicitly recited in the claim, and in the absence of such recitation no such intent is present. For example, as an aid to understanding, the following appended claims may contain usage of introductory phrases such as "at least one" or "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "an imager" should typically be interpreted to mean "at least one imager"); the same holds true for the use of definite articles used to introduce claim recitations. In addition, even if a specific number of an introduced claim recitation is explicitly recited, it will be recognized that such recitation should typically be interpreted to mean at least the recited number (e.g., the bare recitation of "two images," or "a plurality of images," without other modifiers, typically means at least two images). Furthermore, in those instances where a phrase such as "at least one of A, B, and C," "at least one of A, B, or C," or "an [item] selected from the group consisting of A, B, and C," is used, in general, such a construction is intended to be disjunctive (e.g., any of these phrases would include but not be limited to systems that have A alone, B alone, C alone, A and B together, A and C together, B and C together, or A, B, and C together, and may further include more than one of A, B, or C, such as $A_1$, $A_2$, and C together, A, $B_1$, $B_2$, $C_1$, and $C_2$ together, or $B_1$ and $B_2$ together). It will be further understood that virtually any disjunctive word or phrase presenting two or more alternative terms, whether in the description, claims, or drawings, should be understood to contemplate the possibilities of including one of the terms, either of the terms or both terms. For example, the phrase "A or B" will be understood to include the possibilities of "A" or "B" or "A and B."

Although the description above contains many specifics, these should not be construed as limiting the scope of the invention, but as merely providing illustrations of some of the presently preferred embodiments of this invention. Thus, the scope of this invention should be determined by the appended claims and their legal equivalents. Therefore, it will be appreciated that the scope of the present invention fully encompasses other embodiments which may become obvious to those skilled in the art and that the scope of the present invention is accordingly to be limited by the appended claims, in which reference to an element in the singular is not intended to mean "one and only one" unless explicitly so stated, but rather "one or more." All structural, chemical and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component or method step is explicitly recited in the claims. No claim element herein is to be construed under the provisions of 35 U.S.C. 112, sixth paragraph, unless the element is expressly recited using the phrase "means for."

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

While the invention has been described in terms of various specific embodiments, those skilled in the art will recognize that the invention can be practiced with modification within the spirit and scope of the claims.

What is claimed is:

1. An enclosure for a sport utility vehicle having a chassis, and engine compartment and a passenger compartment and a framework extending above the passenger compartment and a windshield assembly which is disposed in front of the passenger compartment and includes a header bar disposed at the top of the windshield which comprises:
    a single flexible sheet dimensioned and configured to include a generally rectangular top section, first and second side portions and a back portion said top section having first and second opposed edges as well as a front edge and a back edge;
    said front edge including a lip dimensioned and configured for engagement with the header bar disposed at the top of the windshield, said first and second side portions each having a top and a bottom, said tops of said first and second side portions extending from said first and second opposed edges of said top section; and
    a back portion extending from said top portion whereby said flexible sheet material and the construction of the apparatus permits rolling the entire single sheet into a roll and to secure the roll to the framework of the vehicle for storage and permitting a user to deploy the enclosure as required by ambient weather changes wherein each of said first and second side portions includes at least one substantially transparent portion and first and second straps for securing the entire rolled up enclosure to the framework of the vehicle;
    wherein said at least one substantially transparent portion is disposed in generally aligned relationship with the head of a passenger seated within the sport utility vehicle and said first and second straps are dimensioned and configured for engagement with the header bar.

* * * * *